United States Patent [19]

Kühtreiber

[11] 4,329,918
[45] May 18, 1982

[54] MEANS FOR THE PRODUCTION OF BEER

[75] Inventor: Franz Kühtreiber, Laa an der Thaya, Austria

[73] Assignee: Braupatent Universal AG, Basel, Switzerland

[21] Appl. No.: 138,852

[22] Filed: Apr. 8, 1980

[30] Foreign Application Priority Data

Apr. 9, 1979 [AT] Austria .............................. 2639/79

[51] Int. Cl.³ .............................................. C12C 5/00
[52] U.S. Cl. ...................................... 99/276; 220/216; 435/812
[58] Field of Search ....................... 99/276, 277, 277.1, 99/277.2, 278; 252/361; 435/DIG. 8, DIG. 12; 220/216; 203/20; 422/41, 42, 43

[56] References Cited

U.S. PATENT DOCUMENTS

| 107,645 | 9/1980 | Worthen | 99/277.1 |
| 2,811,448 | 10/1957 | Rietz | 99/276 |
| 3,346,138 | 10/1967 | Tubbs | 220/216 |
| 3,687,329 | 8/1972 | Baum | 220/216 |
| 3,938,338 | 2/1976 | Cullen | 220/216 |
| 4,106,905 | 8/1978 | Schmitt | 422/41 |

Primary Examiner—Robert W. Jenkins
Attorney, Agent, or Firm—McAulay, Fields, Fisher, Goldstein & Nissen

[57] ABSTRACT

The means includes a layer which comprises a multiplicity of preferably spherical floating bodies with eccentric centers of gravity and which floats on the surface of the beer wort or the new beer or the beer.

As a result of their eccentric center of gravity, the floating bodies maintain a stable floatation position and both the floatation foam which is formed during floatation of the beer wort and also the fermentation foam which is formed during fermentation and post-fermentation of the wort or the new beer are deposited on the floating bodies. In addition, this layer reduces damaging contact of the liquid with the oxygen component in the air space in the wort vessel.

6 Claims, 1 Drawing Figure

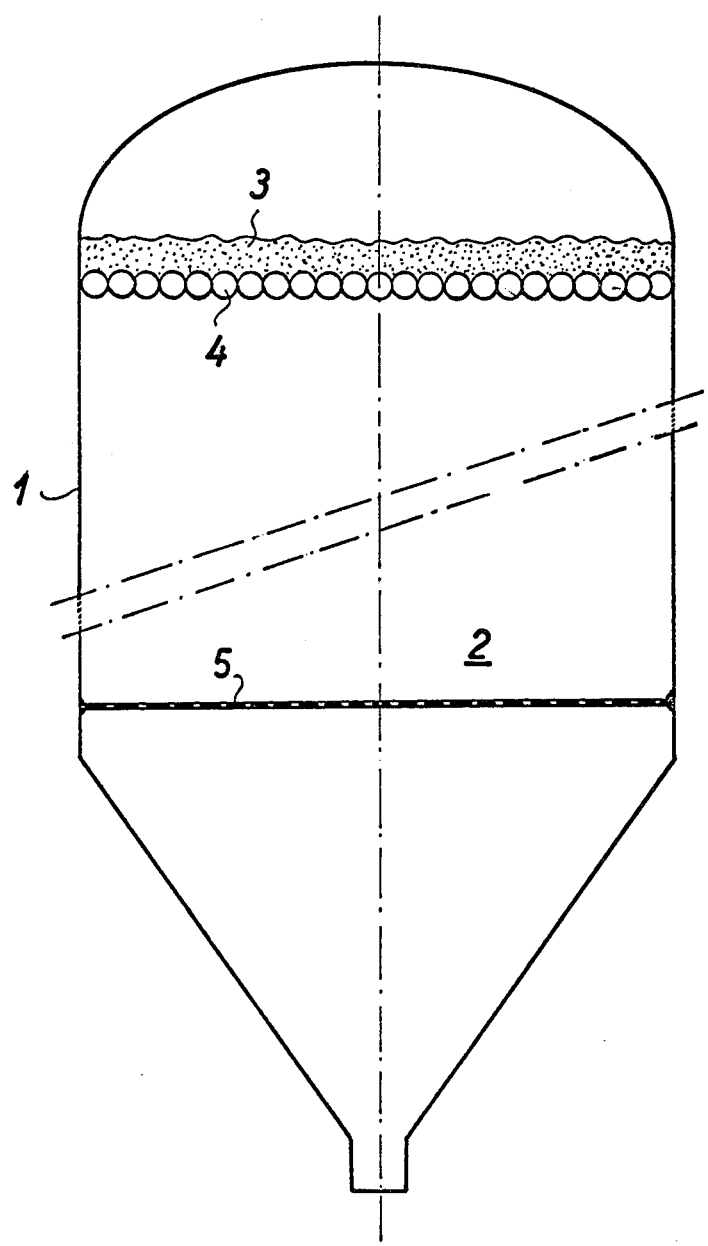

MEANS FOR THE PRODUCTION OF BEER

The invention relates to a means for the production of beer, comprising a cover which floats on the surface of the beer wort or the new beer or the beer and which comprises a multiplicity of preferably spherical floating bodies.

German Pat. No. spec. No. 634,751 is essentially concerned with a means for enhancing beer fermentation and for this purpose provides that a multiplicity of comparatively small bodies which are independent of each other, comprising for example wood, cork, pitch or metal balls, down to dust form, are disposed on the beer or float on the wort and then possibly sink to the bottom. Sprinkling small particles of this kind on the wort or beer, particularly those which have a rough surface, cause release of the carbon dioxide and result in an enhancement in fermentation and an increase in precipitates.

In comparison with the art, the aim of the present invention is to prevent the foam which collects at the surface of the beer wort or the new beer or the beer from sinking back for the time being during the floatation process or during the fermentation process, by means of floating bodies which float on the surface of the beer wort or the new beer or the beer, which foam contains bitter-tasting substances which are precipitated from the wort. The invention also seeks to provide that the young beer or the beer is later protected as far as possible from contact with any oxygen-bearing air which may be in the vessel.

The objects of this invention are attained by providing at least one layer of contiguous floating spheres having an eccentric center of gravity enabling them to maintain a stable floating position under liquid flow conditions.

In this connection, the invention is based on recognition of the fact that the desired effect, namely separation of the substances which rise to the surface of the liquid with the floatation and/or fermentation foam can be satisfactorily ensured only when it is certain that the floating bodies maintain a stable floatation position. The substances which are separated out of the fermentation foam on the top side of the floatation bodies would in fact be carried back into the wort or the new beer if the floatation bodies change their position, for example if spherical floatation bodies rotate.

In order to achieve the maximum separation of the so-called floatation and/or sedimentary substances, in accordance with a further feature of the invention it is advantageous for the floating bodies to be of such a mean density that they are approximately half immersed.

Use of the means according to the invention makes it possible for the first time to produce beer from the floatation process to the conclusion of the post-fermentation process, in high closed large-scale vessels, wherein floatation, main fermentation and post-fermentation can be carried out in the same vessel.

If required the floating bodies may be used in one or more layers in the vessel.

The single FIGURE of the drawings is a diagrammatic view of an embodiment of the subject of the invention.

In particular, the FIGURE shows a vessel 1 which contains beer wort or new beer or beer as indicated at 2, that is to say, a liquid which is to be subjected to floatation, fermentation or post-fermentation, with the production of a foam.

A layer comprising balls 4 with an eccentric centre of gravity floats on the surface of the liquid 2. The layer of balls shields the foam 3 which is formed in the fermentation process from the liquid 2 and the solid matter of the foam is deposited on the layer of balls. The balls 4 are of a density which is such that they are approximately half immersed, and accordingly are of a density of about 0.5 g/cm$^3$. By virtue of the eccentric centre of gravity of the balls 4, the balls 4 remain in a stable floating position even when flow phenomena occur, as in the fermentation of beer wort.

After the vessel 1 is emptied, the solid matter of the fermentation foam layer, which has been deposited on the free top side of the balls 4 can be washed off the balls in the course of the operation of cleaning the vessel 1, without additional expense.

As a test, a large-scale vessel with a capacity of 63,000 liters was filled with beer wort and the free surface of the wort which had been caused to ferment was covered with a layer of floatable balls with an eccentric centre of gravity and a mean density of about 0.5 g/cm$^3$ and a diameter of 200 mm, in such a way that the balls touch each other throughout the layer so that the actual free surface of the wort was restricted to a minimum. This closed layer formed of balls formed a precise separating layer between the liquid and the floatation or fermentation foam during the floatation process, the subsequent fermentation process and even during the process of post-fermentation of the wort or the new beer. The solid constituents of the foam were deposited on the halves of the balls or spheres which projected out of the fermenting wort or new beer, in the form of thick, brownish crusts with a repulsive taste, which it was possible easily to wash off the balls after termination of the fermentation and possibly also the seasoning storage process and after the fermentation vessel had been emptied.

If in the case of draining vessel 1, the balls 4 could sink down to the bottom of vessel 1 these balls would be gathered in the conical bottom and abrade the sediments on the surface of the balls too early and in consequence would contaminate the drained liquid. In vessels with flat bottom the balls 4 would settle there and prevent clearing out the yeast.

So a further feature of this invention is to place a grate 5 at a sufficient distance from the bottom of vessel 1 on which the balls 4 settle after the vessel 1 is drained.

What is claimed is:

1. Apparatus for the production of a liquid subjected in its production to flotation, fermentation or post-fermentation with the formation of a foam, comprising a vessel including peripheral walls and a bottom, and in said vessel, at least one substantially closed layer formed of contiguous, semi-submersible spheres floating on the surface of said liquid and confined between said walls, said spheres having an eccentric center of gravity in order to maintain a stable floating position on said surface despite stable flow conditions;

said layer separating said foam from said liquid, preventing said foam from returning to said liquid and protecting said liquid from air in said vessel.

2. The apparatus of claim 1, wherein said spheres are of such density as to be approximately half immersed in said liquid.

3. The apparatus of claim 2, wherein said spheres have a mean density of about 0.5 g/cm$^3$.

4. The apparatus of claim 2, wherein said spheres have a diameter of about 200 mm.

5. The apparatus of claim 1, wherein said liquid is beer, beer wort or new beer.

6. The apparatus according to claim 1, further including a grate on said vessel in spaced apart relation from said bottom and adapted to retain thereon said spheres after draining said liquid from said vessel.

* * * * *

UNITED STATES PATENT AND TRADEMARK OFFICE
CERTIFICATE OF CORRECTION

PATENT NO. : 4,329,918
DATED : May 18, 1982
INVENTOR(S) : Franz Kuhtreiber

It is certified that error appears in the above—identified patent and that said Letters Patent is hereby corrected as shown below:

On the title page, under References Cited, [56] U.S. Patent Documents, please change "9/1980" to --9/1870--

Signed and Sealed this

Twenty-first Day of September 1982

[SEAL]

Attest:

GERALD J. MOSSINGHOFF

Attesting Officer     Commissioner of Patents and Trademarks